(No Model.)

J. L. P. LEMAN.
SUCTION VALVE FOR ARTIFICIAL PALATES.

No. 306,627. Patented Oct. 14, 1884.

Witnesses: Inventor,
J. A. Rutherford John L. P. Leman.
Robert Everett, By James L. Norris.
Atty.

N. PETERS. Photo-Lithographer, Washington, D. C.

UNITED STATES PATENT OFFICE.

JOHN LOUIS PIGOT LEMAN, OF BEACONSFIELD VILLA, BINGHAM ROAD, RADCLIFFE-ON-TRENT, COUNTY OF NOTTINGHAM, ENGLAND.

SUCTION-VALVE FOR ARTIFICIAL PALATES.

SPECIFICATION forming part of Letters Patent No. 306,627, dated October 14, 1884.

Application filed March 26, 1884. (No model.) Patented in England January 14, 1884, No. 1,417.

*To all whom it may concern:*

Be it known that I, JOHN LOUIS PIGOT LEMAN, a subject of the Queen of Great Britain, residing at Beaconsfield Villa, Bingham Road, Radcliffe-on-Trent, in the county of Nottingham, England, have invented a certain new and useful Suction-Valve for Exhausting Air from Chambers in Artificial Palates for Dental Purposes, (for which I have obtained a patent in Great Britain, No. 1,417, bearing date January 14, 1884,) of which the following is a specification.

The object of my invention is to improve the construction of such artificial palates as are retained in their places by suction by providing improved means of obtaining and retaining a vacuum between the natural and artificial palates; and in order that my said invention may be clearly understood reference is hereby made to the accompanying drawings, in which similar letters of reference indicate corresponding parts, such drawings being to an enlarged scale for greater clearness.

Figure 1:
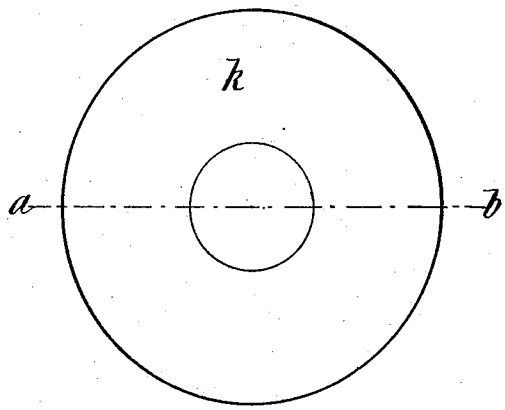
Figure 2:
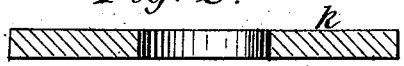
Figure 3:
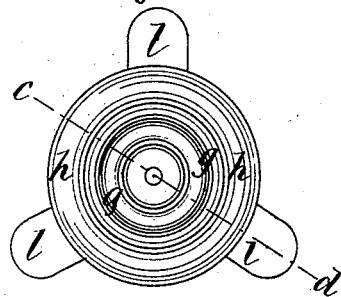
Figure 4:
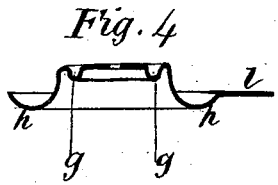
Figure 5:
Figure 6:
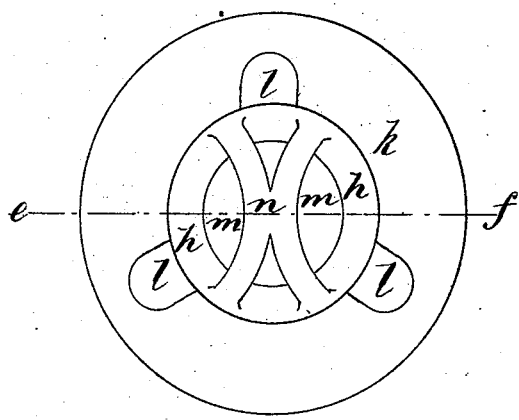
Figure 7:
Figure 8:
Figure 9:

Figure 1 is a disk composed of pure tin, or a mixture of pure tin and lead or other suitable metal, having a central hole, as shown, and Fig. 2 is a section of the same on the lines $a\ b$ of Fig. 1. Fig. 3 is a front view of the valve-case $h$ and collar $g$, and Fig. 4 is a section of the same on the line $c\ d$ of Fig. 3. Fig. 5 is a view of a pair of united bars which act as a shield to the valve. Fig. 6 is a view of the complete valve, and Fig. 9 is a section on the line $e\ f$ of Fig. 6. Fig. 7 is a plan of an india-rubber washer which rests upon the collar $g$, and Fig. 8 is a section of the same.

The disk $k$ is fitted to the model of the mouth, and forms an air-chamber. The valve-case $h$ and the collar $g$ rest upon the disk $k$. The valve-case $h$ has three tabs, $l\ l\ l$, which secure it to the artificial palate. The collar $g$ is raised to form a valve-seat, as shown in Figs. 4 and 9, and forms an air-tight joint when the valve $m$ is pressed against it by the pressure of the atmosphere. In the center of the valve-seat or collar $g$ there is a small hole that allows any air to be withdrawn which accidentally or otherwise may have obtained access between the natural palate and the artificial palate. The united bars $n$ are soldered to the collar $h$, as shown in Fig. 6, before the insertion of the india-rubber valve $m$. The form of the bars $n$ may be varied, their purpose being to keep the valve $m$ from falling away from its seat, and to allow the valve sufficient play to let the air pass outward.

The action of my said invention is as follows: When the palate is placed in the mouth, the air is expelled through the valve outward, and if the air at any time should obtain access to the back of the palate, between the natural and artificial palates, the wearer can immediately draw or suck out such air through the valve, and the palate is then securely held in its place by the vacuum thus produced.

The various parts of the valve, except the valve $m$, may be made of gold, platina, silver, or their alloys.

Having now particularly described the nature of my said invention and in what manner the same is to be performed, I declare that what I claim is—

1. A valve for an artificial palate, consisting of the combination of the disk $k$, the valve-case $h$, formed with the seat $g$, and fitted in an opening formed in disk $k$, and the loose valve-washer $m$, secured within the case $h$, and movable therein from off its seat, substantially as and for the purpose set forth.

2. The combination of the disk $k$, valve-case $h$, formed with seat $g$, and fitted in an opening in disk $k$, the loose valve-washer $m$, and bars $n$, secured to the case and retaining the valve-washer in position, all forming a valve for an artificial palate, substantially as described.

In testimony whereof I have hereto set my hand this 1st day of March, 1884.

JOHN LOUIS PIGOT LEMAN.

Witnesses:
    J. W. MARTIN,
    GEO. SEARLE BLAKE,
*Both of Low Pavement, Nottingham, Solicitors.*